United States Patent [19]

Clark

[11] Patent Number: 4,489,144

[45] Date of Patent: Dec. 18, 1984

[54] ISOXAZOLE DERIVATIVE ADDITIVE IN ORGANIC ELECTROLYTES OF NONAQUEOUS CELLS EMPLOYING SOLID CATHODES

[75] Inventor: Milton B. Clark, Olmsted Township, Cuyahoga County, Ohio

[73] Assignee: Union Carbide Corporation, Danbury, Conn.

[21] Appl. No.: 479,744

[22] Filed: Mar. 28, 1983

[51] Int. Cl.³ .............................................. H01M 6/16
[52] U.S. Cl. .................................. 429/196; 429/197; 429/218
[58] Field of Search ............... 429/194, 196, 197, 198, 429/101, 218

[56] References Cited

U.S. PATENT DOCUMENTS

| | | | |
|---|---|---|---|
| 3,778,310 | 12/1973 | Garth | 429/197 |
| 3,951,685 | 4/1976 | Kronenberg | 429/197 |
| 3,996,069 | 12/1976 | Kronenberg | 429/197 |
| 4,163,829 | 8/1979 | Kronenberg | 429/194 |
| 4,218,523 | 8/1980 | Kalnoki-Kis | 429/101 |
| 4,301,220 | 11/1981 | Evans et al. | 429/197 |
| 4,302,520 | 11/1981 | Evans et al. | 429/194 |

FOREIGN PATENT DOCUMENTS 147370 1/1981 Japan .

*Primary Examiner*—Anthony Skapars
*Attorney, Agent, or Firm*—Cornelius F. O'Brien

[57] ABSTRACT

The invention relates to a nonaqueous cell employing an anode, a cathode and an organic electrolyte wherein the cathode comprises an active cathode material and carbon and/or graphite, and the organic electrolyte contains an isoxazole derivative in a range of between greater than 0.2 and about 2.0 volume percent based on the volume of the electrolyte solvent so as to aid in reducing the undesirably high initial open circuit voltage normally observed with the use of cathodes such as $FeS_2$.

12 Claims, No Drawings

4,489,144

ISOXAZOLE DERIVATIVE ADDITIVE IN ORGANIC ELECTROLYTES OF NONAQUEOUS CELLS EMPLOYING SOLID CATHODES

DESCRIPTION

1. Technical Field

The invention relates to a nonaqueous cell employing an anode; a cathode comprising a major amount of an active cathode material and a minor amount of graphite and/or carbon; and an organic electrolyte containing a minor amount of an isoxazole derivative, such as 3,5-dimethylisoxazole (DMI) or 5-methylisoxazole, to aid in reducing any undesirably high initial open circuit voltage such as that normally observed with cathodes such as $FeS_2$.

2. Background Art

The development of high energy cell systems requires the compatibility of an electrolyte possessing desirable electrochemical properties with highly active anode materials, such as lithium, calcium, sodium and the like, and the efficient use of high energy density cathode materials, such as $FeS_2$, $Co_3O_4$, $PbO_2$ and the like. The use of aqueous electrolytes is precluded in these systems since the anode materials are sufficiently active to react with water chemically. Therefore, in order to realize the high energy density obtainable through use of these highly reactive anodes and high energy density cathodes, it is necessary to use a nonaqueous electrolyte system.

Many cell or battery applications, particularly in transistorized devices, such as hearing aids, watches, calculators, and the like, require a substantially unipotential discharge source for proper operation. However, it has been found that in many nonaqueous cells employing positive active materials which include conductive additives such as graphite and/or carbon, the cell upon initially being discharged, exhibits a high voltage whereupon the cell then proceeds to reach its lower operating discharge voltage level only after a certain time period has elapsed. The time period for the cell to reach its intended operating discharge voltage level usually depends on the discharge rate through the load and thus, depending on the apparatus it is to power, could result in a period extending up to several hours or even days. This phenomenon has serious drawbacks when a cell is intended to be used in electronic devices requiring a substantially unipotential discharge source for proper operation. In some of these electronic devices, any initial voltage peak substantially exceeding the intended operating voltage for the device could result in serious damage to the electronic components of the device. One approach to protect devices from batteries exhibiting high voltages prior to leveling off to their desired operating voltage level is to add additional electronic circuit components to protect the main operating components of the device. However, this not only adds to the expense of the device but also would result in enlarging the device to accommodate the protective circuitry. With the emphasis placed on miniaturization, it has become necessary for the battery industry to design smaller and smaller miniature power cells.

To compensate for or to eliminate this initial high voltage during discharge of nonaqueous cells, it has been suggested in U.S. Pat. No. 4,018,970 that graphite and/or carbon which is normally employed as a conducting material in the cathodes of these cells be eliminated and replaced with another electronic conductor. It also disclosed that when the electronic conductor has, in relation to the postulated decomposition of the electrolyte, an overvoltage such as the decomposition takes place only at a potential lower than the positive active material reduction potential, then the electrolyte decomposition does not take place before the discharge of the positive active material, since the latter reduction maintains the electrode at a potential which is too high for the decomposition to take place. Thus, the teachings in this reference basically require that the normal conductive materials of graphite and/or carbon, which are normally employed in cathodes, be eliminated.

U.S. Pat. No. 4,163,829 discloses nonaqueous cells which employ an anode, an organic electrolyte and a cathode comprising an active cathode material, carbon and/or graphite and an amount of a metallic reducing agent to reduce any materials in the cell which are more cathodic (positive) than the active cathode material with respect to the cell's working anode. This will effectively reduce any impurities or active species in the cathode that have a potential higher than that of the metallic reducing agent. However, once such impurities or active species have been reduced to the potential of the metallic reducing agent, some unwanted species still remain that may result in an unacceptably high open circuit voltage.

Accordingly, it is the primary object of this invention to provide a nonaqueous cell having an anode; a cathode comprising an active cathode material and a conductive material of graphite and/or carbon; and an organic electrolyte containing a minor amount of an isoxazole derivative to aid in reducing any undesirably high initial open circuit voltages such as those observed with cathodes such as $FeS_2$.

Another object of the present invention is to provide a nonaqueous cell which employs a cathode having a graphite and/or carbon additive to improve the conductivity of the cathode and which exhibits a substantially unipotential voltage output during discharge.

Another object of the present invention is to provide a nonaqueous cell employing an anode; a cathode comprising an active cathode material, graphite and/or carbon, and a metallic reducing agent either within the cathode or in electrical and ionic contact with the cathode; and an isoxazole derivative additive in the cell's organic electrolyte such that during initial discharge of the cell, a substantially unipotential discharge voltage will be exhibited.

Another object of the present invention is to provide a nonaqueous lithium cell employing an $FeS_2$ cathode containing a minor amount of graphite and/or carbon along with a metallic reducing agent, and an organic electrolyte having a minor amount of an isoxazole derivative, said cell exhibiting a substantially unipotential discharge voltage.

SUMMARY OF THE INVENTION

The invention basically relates to a nonaqueous cell having an anode; an organic electrolyte; and a solid cathode, said solid cathode comprising a major amount of a solid active cathode material and a minor amount of graphite and/or carbon; and said organic electrolyte containing an isoxazole derivative in a range between greater than 0.2 and about 2.0 volume percent based on the volume of the electrolyte solvent.

The addition of an isoxazole derivative, such as 3,5-dimethylisoxazole (DMI) and/or 5-methylisoxazole, to nonaqueous organic electrolytes is effective in reducing and stabilizing the undesirably high initial open circuit voltages observed with cathode materials such as FeS$_2$. These isoxazole derivatives are 5-membered heterocyclic structures with an oxygen and a nitrogen atom in adjoining positions in the ring, as shown below:

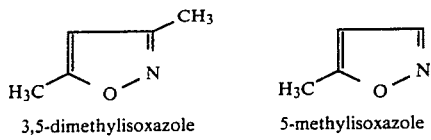

3,5-dimethylisoxazole     5-methylisoxazole

The additives are employed in the concentration range of between greater than 0.2 and about 2.0 volume percent based on the volume of the electrolyte solvent, preferably between about 0.4 and about 1.0 volume percent, and appear to produce a synergistic effect when used in conjunction with a metallic reducing metal additive (e.g., zinc) in the cathode. These particular isoxazole derivatives are believed to function through breaking of the ring at the less stable N—O bond due to reaction with the highly active species on the carbonaceous conductive matrix in the cathode, said active species being presumed to cause the undesirably high initial open circuit voltage.

The isoxazole derivative structure is believed to be effective because it can be easily oxidized. The N—O bond energy is only 48 kilocalories compared to much higher bond energies for C—N (72.8 kilocalories), C=N (147 kilocalories), or C—O (85.5 kilocalories).

Observation of the open circuit voltage behavior of nonaqueous cells employing carbon and/or graphite-containing active cathodes, revealed that in all cases observed, the cells' open circuit voltage curves showed an inflection at a voltage above the normal operating discharge voltage. It is believed that, for cathodes containing a metal reducing additive such as zinc, the drop in open circuit voltage down to the inflection is due to reduction by the metallic reducing additive of the impurities or active species responsible for the initially high open circuit voltage values. The addition of an isoxazole derivative, preferably 3,5-dimethylisoxazole (DMI), will reduce remaining unwanted active species or impurities at a rate much higher than would occur with the use of only the metallic reducing additive.

The amount of the isoxazole derivative below 0.2 volume percent based on the volume of the electrolyte solvent would not provide sufficient reducing material to quickly and effectively reduce impurities and/or unwanted active species in the cell system. An amount above 2.0 volume percent based on the volume of the electrolyte solvent may provide excessive reducing material that could cause deleterious effects on other desired aspects of the cell. Although the best embodiment of the invention would include the use in the cathode of a metallic reducing agent in conjunction with the isoxazole derivative additive in the electrolyte, the isoxazole derivative additive could be used without the metallic reducing agent in the cell. When used without the metallic reducing agent, the amount of isoxazole derivative to be added should be near the higher end of the range.

The amount of the metallic reducing additive or agent to be added to the cathode as per the teachings of U.S. Pat. No. 4,163,829 should be sufficient to reduce materials in the cell that are more cathodic than the working active cathode materials with respect to the working anode. Generally between about 1 to about 20 weight percent, preferably about 2 to 4 weight percent, based on the weight of the cathode mix (active cathode material, conductive agent and binder, if any) would be suitable for most applications. Based on the amount of graphite and/or carbon in the cathode, the metallic reducing agent could be added in an amount of between about 10 and about 100 percent, preferably about 20 percent of the weight of the graphite and/or carbon.

Although not wanting to be bound by theory, it is believed that when employing battery grade carbon and/or graphite as an additive to solid cathodes for use in nonaqueous systems, the carbon and/or graphite appears to have a small quantity of sorbed oxygen or oxygen-containing compounds on its surface, which supports a high open circuit voltage reading versus the anode of the cell. These oxygen-containing surface materials also appear to show some coulombic capacities, so that the initial discharge voltage of the cell may be above the normal operating plateau until the oxygen-containing material is reduced. It has been found that the undesirably high voltage level exhibited during the initial discharge of nonaqueous cells employing solid cathodes can be eliminated by the addition of a isoxazole derivative in the electrolyte with or without the addition of a metallic reducing agent to react with the oxygen species on the carbon and/or graphite. The additive should be added in an amount sufficient to fully reduce the oxygen species without reacting excessively with the active cathode material. With respect to the metallic reducing agent, this can be accomplished if the potential of the metallic reducing agent is within about 0.3 volt of the potential attained by the active cathode material or is more positive than the active cathode material and less positive than the oxygen species on the graphite and/or carbon material with respect to the cell's anode. For example, in a nonaqueous lithium/FeS$_2$ system, the potential at low drain rates is about 1.7 volts and the potential of the lithium/oxygen species is about 3.0 volts. Thus, a reducing agent could be added to the FeS$_2$ cathode mix containing the oxygen species that would reduce the oxygen species while reducing very little if any of the FeS$_2$. In addition, metallic reducing agents which have potentials below that of the active cathode material with respect to the cell working anode, i.e., which are anodic with respect to the active cathode material, could be employed in accordance with this invention, provided that they are not added in an amount sufficient to reduce more than about 10 percent, preferably not more than 5 percent, of the active cathode material.

Consequently, in accordance with this invention, it is possible to maintain the use of graphite and/or carbon as an electronic conductor in the preparation of solid cathode mixes while, at the same time, eliminating the undesirably high voltage level usually exhibited during the initial discharge of nonaqueous cells employing such electronic conductors. Thus, in accordance with the preferred embodiment of the invention, a reducing agent or a sacrificial anode is included in the cathode of the cell and an isoxazole derivative is added to the electrolyte for the purpose of reducing the undesirable cathodic materials that may be present in the cell that are more cathodic than the working active cathode materials with respect to the working anode. This will effectively provide a cell which will discharge within a narrow voltage output range.

The metallic reducing agent can either be employed in a mixture in the forming of a cathode or it could be placed in contact with the cathode. Thus, any discrete material such as a layer, a coating, a metallic screen, a metallic strip, a porous metallic strip, or a powder and could be employed as long as it is in electronic and ionic contact with the cathode. The choice of a metallic reducing agent will depend upon the voltage of the cell's active cathode material with reference to the anode of the cell. For example, while zinc may be satisfactory for a nonaqueous lithium/FeS$_2$ system, it may not be suitable for a nonaqueous lithium/Ag$_2$O system since, in the latter, a less anodic (negative) metallic reducing agent may be required, such as tin or lead. Thus, once the EMF series is determined for a specific nonaqueous electrolyte and anode/cathode system, it will be easy to accurately select which metallic reducing agents can be used in conjunction with the isoxazole derivative additive.

Table 1 is a rough guide for selection of the metal additives to be used as metallic reducing agents for different active cathode materials intended for employment in a lithium nonaqueous system. These are only estimates, and results will vary somewhat, depending on the electrolyte system selected.

TABLE 1

| Active Cathode Materials | *Approximate Operating Potential (V) | Common Metals in Proper Potential Range |
|---|---|---|
| FeS$_2$ | 1.7 | Nb, Co, Fe, Cd, Zn, In, Sn, Pb |
| Bi$_2$O$_3$ | 1.7 | Ibid |
| CuO, CoS, Pb$_3$O$_4$ | 1.6 | Ibid |
| In$_2$S$_3$, PbS | 1.4 | Zr, Nb, Co, Zn, Fe, Cd, In, Sn, Pb |
| Co$_3$O$_4$ | 1.3 | Ti, Zr, Nb, Co, Zn, Fe, Cd, In, Sn, Pb |
| Ag$_2$O | 2.2 | Fe, Cd, In, Nb, Co, Sn, Pb |

*With respect to lithium.

Suitable metallic reducing agents can be selected from the group consisting of zinc, iron, cadmium, niobium, cobalt, indium, tin, lead, zirconium and titanium. In addition, if the amount of reducing agent employed is carefully limited, more active metallic reducing agents such as lithium, sodium, potassium, magnesium, aluminum, or calcium may be used.

In the nonaqueous cell systems of this invention, suitable active cathode materials would include CF$_x$, metal oxides, such as V$_2$O$_5$, WO$_3$, MoO$_3$, lead oxides (e.g., Pb$_3$O$_4$ and PbO), cobalt oxides, MnO$_2$, In$_2$S$_3$, iron sulfides (e.g., FeS, FeS$_2$), NiS, metal chromates, such as Ag$_2$CrO$_4$, metal phosphates, such as Ag$_3$PO$_4$, and metal sulfates, such as CuSO$_4$.

Highly active anodes for use in nonaqueous systems according to this invention would be consumable metals and include aluminum, the alkali metals, alkaline earth metals and alloys of alkali metals or alkaline earth metals with each other and other metals. The term "alloys" as used herein is intended to include mixtures, solid solutions, such as lithium-magnesium, and the intermetallic compounds, such as lithium monoaluminide. The preferred anode materials are lithium, sodium, potassium, calcium, magnesium and alloys thereof. Of the preferred anode materials, lithium would be the best because, in addition to being a ductile metal that can be easily assembled in a cell, it possesses the highest energy-to-weight ratio of the group of suitable anodes.

In nonaqueous cells, useful organic solvents employed alone or mixed in the cell of this invention include the following classes of compounds:

Alkylene nitriles: e.g., crotonitrile (liquid ranges, $-51.1°$ C. to 120° C.)
Trialkyl borates: e.g., trimethyl borate, (CH$_3$O)$_3$B (liquid range, $-29.3°$ C. to 67° C.)
Tetraalkyl silicates: e.g., tetramethyl silicate, (CH$_3$O)$_4$Si (boiling point, 121° C.)
Nitroalkanes: e.g., nitromethane, CH$_3$NO$_2$ (liquid range, $-17°$ C. to 100.8° C.)
Alkylnitriles: e.g., acetonitrile, CH$_3$CN (liquid range, $-45°$ C. to 81.6° C.)
Dialkylamides: e.g., dimethylformamide, HCON(CH$_3$)$_2$ (liquid range, $-60.48°$ C. to 149° C.)
Lactams: e.g., N-methylpyrrolidone,

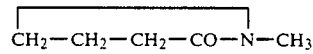
CH$_2$—CH$_2$—CH$_2$—CO—N—CH$_3$ (liquid range, $-16°$ C. to 202° C.)
Monocarboxylic acid esters: e.g., ethyl acetate (liquid range, $-83.6°$ to 77.06° C.)
Orthoesters: e.g., trimethylorthoformate, HC(OCH$_3$)$_3$ (boiling point, 103° C.)
Lactones: e.g., γ(gamma)butyrolactone,

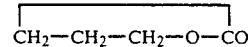
CH$_2$—CH$_2$—CH$_2$—O—CO (liquid range, $-42°$ to 206° C.)
Dialkyl carbonates: e.g., dimethylcarbonate, OC(OCH$_3$)$_2$ (liquid range, 2° to 90° C.)
Alkylene carbonates: e.g., propylene carbonate

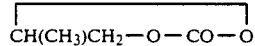
CH(CH$_3$)CH$_2$—O—CO—O (liquid range, $-48°$ to 242° C.)
Monoethers: e.g., diethyl ether (liquid range, $-116°$ to 34.5° C.)
Polyethers: e.g., 1,1-and 1,2-dimethoxyethane (liquid ranges, $-113.2°$ to 64.5° C. and $-58°$ to 83° C., respectively)
Cyclic ethers: e.g., tetrahydrofuran (liquid range, $-65°$ to 67° C.); 1,3-dioxolane (liquid range, $-95°$ to 78° C.)
Nitroaromatics: e.g., nitrobenzene (liquid range, 5.7° to 210.8° C.)
Aromatic carboxylic acid halides: e.g., benzoyl chloride (liquid range, 0° to 197° C.); benzoyl bromide (liquid range, $-24°$ to 218° C.)
Aromatic sulfonic acid halides: e.g., benzene sulfonyl chloride (liquid range, 14.5° to 251° C.)
Aromatic phosphonic acid dihalides: e.g., benzene phosphonyl dichloride (boiling point, 258° C.)
Aromatic thiophosphonic acid dihalides: e.g., benzene thiophosphonyl dichloride (boiling point, 124° C. at 5 mm)
Cyclic sulfones: e.g., sulfolane, $$CH_2-CH_2-CH_2-CH_2-SO_2$$

(melting point, 22° C. 3-methylsulfolane (melting point, −1° C.)

Alkyl sulfonic acid halides: e.g., methanesulfonyl chloride (boiling point, 161° C.)

Alkyl carboxylic acid halides: e.g., acetyl chloride (liquid range, −112° to 50.9° C.); acetyl bromide (liquid range, −96° to 76° C.); propionyl chloride (liquid range, −94° to 80° C.)

Saturated heterocyclics: e.g., tetrahydrothiophene (liquid range, −96° to 121° C.); 3-methyl-2-oxazolidone (melting point, 15.9° C.)

Dialkyl sulfamic acid halides: e.g., dimethyl sulfamyl chloride (boiling point, 80° C. at 16 mm)

Alkyl halosulfonates: e.g., ethyl chlorosulfonate (boiling point, 151° C.)

Unsaturated heterocyclic carboxylic acid halides: e.g., 2-furoyl chloride (liquid range, −2° to 173° C.)

Five-membered unsaturated heterocyclics: e.g. 1-methylpyrrole (boiling point, 114° C.); 2,4-dimethylthiazole (boiling point, 144° C.); furan (liquid range, −85.65° to 31.36° C.)

Esters and/or halides of dibasic carboxylic acids; e.g., ethyl oxalyl chloride (boiling point, 135° C.)

Mixed alkyl sulfonic acid halides and carboxylic acid halides, e.g., chlorosulfonyl acetyl chloride (boiling point, 98° C. at 10 mm)

Dialkyl sulfoxides: e.g., dimethyl sulfoxide (liquid range, 18.4° to 189° C.)

Dialkyl sulfates: e.g., dimethylsulfate (liquid range, −31.75° to 188.5° C.)

Dialkyl sulfites: e.g., dimethylsulfite (boiling point, 126° C.)

Alkylene sulfites: e.g., ethylene glycol sulfite (liquid range, −11° to 173° C.)

Halogenated alkanes: e.g., methylene chloride (liquid range, −95° to 40° C.); 1,3-dichloropropane (liquid range, −99.5° to 120.4° C.).

Of the above, the preferred solvents are sulfolane; crotonitrile; nitrobenzene; tetrahydrofuran; methyl-substituted tetrahydrofuran; 1,3-dioxolane; 3-methyl-2-oxazolidone; propylene or ethylene carbonate; γ-butyrolactone; ethylene glycol sulfite; dimethylsulfite; dimethyl sulfoxide; and 1,1- and 1,2-dimethoxyethane. Of the preferred solvents, the best are 3-methyl-2-oxazolidone, propylene or ethylene carbonate, 1,1- and 1,2-dimethoxyethane, and 1,3-dioxolane because they appear more chemically inert to battery components and have wide liquid ranges, and especially because they permit highly efficient utilization of the cathode materials.

The ionizing solute for use in the invention may be a simple or double salt or mixtures thereof, e.g., LiCF$_3$SO$_3$ or LiClO$_4$, which will produce an ionically conductive solution when dissolved in one or more solvents. Useful solutes include complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July/December 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, lithium bromide, potassium fluoride, potassium chloride and potassium bromide.

A separator for use in this invention has to be chemically inert and insoluble in the cell system and have a porosity so as to permit the liquid electrolyte to permeate through and contact the anode of the cell, thus establishing an ion transfer path between the anode and cathode.

The container housing for the cell can be made of stainless steel, iron, nickel, nickel-plated steel or some other conductive material that will not corrode or otherwise deteriorate when in contact with the cell materials.

The insulating member disposed between the cover and the can has to be stable in the presence of the cell components and can be selected from such materials as polytetrafluoroethylene, fluorinated ethylene-propylene (e.g., FEP), ethylene copolymer with FEP, polychlorotrifluoroethylene, perfluoro-alkoxy polymer (e.g., PFA), polyvinyl, polyethylene, polypropylene, polystyrene, nylon, etc.

EXAMPLE 1

Miniature size button cells were constructed using the Li/FeS$_2$ system. The cells were 0.455 inch in diameter by 0.22 inch in height. The cells consisted of a lithium disc; an FeS$_2$ cathode made of a wet mix containing 82 percent FeS$_2$, 8 percent carbon black, 8 percent of an aqueous polytetrafluoroethylene emulsion and 2 percent zinc; a separator; and an electrolyte comprising 1 M LiCF$_3$SO$_3$ in 50 volume percent dimethoxyethane and 50 volume percent 3-methyl-2-oxazolidone. In some of the cells, a small volume percent of 3,5-dimethylisoxazole (DMI) was added to the electrolyte and then the average open circuit voltages (OCV) of three cells in each case were measured over a period of time. The results are shown in Table I.

TABLE I

| Time on OCV (days) | DMI ADDITIVE | | | |
|---|---|---|---|---|
| | none OCV (volts) | 0.2 vol/% OCV (volts) | 0.5 vol/% OCV (volts) | 1.0 vol/% OCV (volts) |
| 0 | 2.38 v. | 2.37 v. | 2.37 v. | 2.36 v. |
| 1 | 2.31 | 2.33 | 2.33 | 2.33 |
| 2 | 2.30 | 2.30 | 2.28 | 2.25 |
| 3 | 2.29 | 2.19 | 2.18 | 2.16 |
| 4 | 2.30 | 2.13 | 2.12 | 2.10 |
| 5 | 2.30 | 2.08 | 2.06 | 2.03 |
| 6 | 2.31 | 2.00 | 2.00 | 1.97 |
| 7 | 2.31 | 1.95 | 1.95 | 1.92 |
| 8 | 2.31 | 1.93 | 1.92 | 1.87 |

TABLE I-continued

| | DMI ADDITIVE | | | |
|---|---|---|---|---|
| Time on OCV (days) | none OCV (volts) | 0.2 vol/% OCV (volts) | 0.5 vol/% OCV (volts) | 1.0 vol/% OCV (volts) |
| 9 | 2.31 | 1.93 | 1.87 | 1.84 |
| 10 | 2.31 | 1.92 | 1.82 | 1.81 |
| 11 | 2.30 | 1.91 | 1.80 | 1.76 |
| 12 | 2.30 | 1.92 | 1.79 | 1.74 |
| 13 | 2.30 | 1.91 | 1.77 | 1.73 |
| 14 | 2.30 | 1.91 | 1.76 | 1.73 |

EXAMPLE 2

Miniature size button cells were constructed substantially as in Example 1 except that the height was 0.118 inch and the electrolyte employed comprised 1 M $LiCF_3SO_3$ in 40 volume percent dioxolane, 30 volume percent dimethoxyethane and 30 volume percent 3-methyl-2-oxazolidone. In some cells, a small volume percent of 3,5-dimethylisoxazole (DMI) or 5-methylisoxazole was added to the electrolyte and then the average open circuit voltages (OCV) of three cells in each case were measured over a period of time. The results are shown in Table II.

TABLE II

| | Additive | | |
|---|---|---|---|
| Time on OCV (days) | none OCV (volts) | 0.2 vol % DMI OCV (volts) | 0.2 vol % 5-methylisoxazole OCV (volts) |
| 0 | 2.33 v. | 2.46 v. | 2.54 v. |
| 1 | 2.31 | 2.31 | 2.28 |
| 2 | 2.29 | 2.18 | 2.16 |
| 3 | 2.28 | 2.10 | 2.10 |
| 4 | 2.27 | 2.09 | 2.05 |
| 5 | 2.26 | 2.07 | 1.99 |
| 6 | 2.24 | 2.06 | 1.97 |
| 7 | 2.21 | 2.05 | 1.95 |
| 8 | 2.19 | 2.04 | 1.94 |
| 9 | 2.18 | 2.03 | 1.93 |
| 10 | 2.17 | 2.03 | 1.94 |
| 11 | 2.16 | 2.03 | 1.94 |
| 12 | 2.15 | 2.02 | 1.94 |
| 13 | 2.15 | 2.01 | 1.92 |
| 14 | 2.14 | 2.00 | 1.91 |

I claim:

1. A nonaqueous cell comprising an anode; an organic electrolyte solution comprising a solute dissolved in a organic solvent; and a solid cathode, said cathode comprising a major amount of a solid active cathode material and a minor amount of graphite and/or carbon; and said organic electrolyte solution containing an isoxazole derivative in a range between greater than 0.2 and about 2.0 volume percent based on the volume of the organic solvent.

2. The nonaqueous cell of claim 1 wherein the isoxazole derivative is selected from the group consisting of 3,5-dimethylisoxazole and 5-methylisoxazole.

3. The nonaqueous cell of claim 2 wherein the isoxazole derivative is in a range between about 0.4 and about 1.0 volume percent based on the volume of the electrolyte solvent.

4. The nonaqueous cell of claim 2 wherein the active cathode material is selected from the group consisting of $CF_x$, $V_2O_5$, $WO_3$, $MoO_3$, lead oxides, cobalt oxides, $MnO_2$, copper oxides, CuS, $CoS_2$, $In_2S_3$, iron sulfides, NiS, $Ag_2CrO_4$, $Ag_3PO_4$ and $CuSO_4$ and wherein the anode is selected from the group consisting of lithium, sodium, potassium, calcium, magnesium and alloys thereof.

5. The nonaqueous cell of claim 4 wherein the active cathode material is $FeS_2$ and the anode is lithium.

6. The nonaqueous cell of claim 2 wherein a minor amount of a metallic reducing agent is contained in said solid cathode, said metallic reducing agent being sufficient to reduce materials in the cell which are more cathodic than the active cathode material with respect to the anode.

7. The nonaqueous cell of claim 6 wherein the metallic reducing agent is incorporated throughout the cathode.

8. The nonaqueous cell of claim 6 wherein the metallic reducing agent is a discrete material in electrical and ionic contact with the cathode.

9. The nonaqueous cell of claim 6 wherein the metallic reducing agent is selected from the group consisting of zinc, niobium, cobalt, iron, cadmium, indium, tin, lead, zirconium, titanium, lithium, sodium, potassium, magnesium, aluminum and calcium.

10. The nonaqueous cell of claim 6 wherein the metallic agent is zinc.

11. The nonaqueous cell of claim 6 wherein the active cathode material is selected from the group consisting of $CF_x$, $V_2O_5$, $WO_3$, $MoO_3$, lead oxides, cobalt oxides, $MnO_2$, copper oxides, CuS, $CoS_2$, $In_2S_3$, iron sulfides, NiS, $Ag_2CrO_4$, $Ag_3PO_4$ and $CuSO_4$ and wherein the anode is selected from the group consisting of lithium, sodium, potassium, calcium, magnesium and alloys thereof.

12. The nonaqueous cell of claim 6 wherein the active cathode material is $FeS_2$ and the anode is lithium.

* * * * *